(12) United States Patent
Smith

(10) Patent No.: US 9,822,274 B2
(45) Date of Patent: Nov. 21, 2017

(54) PUTTY PAINT

(71) Applicant: Crayola LLC, Easton, PA (US)

(72) Inventor: Linda J. Smith, Freemansburg, PA (US)

(73) Assignee: CRAYOLA, LLC, Easton, PA (US)

( * ) Notice: Subject to any disclaimer, the term of this patent is extended or adjusted under 35 U.S.C. 154(b) by 0 days.

(21) Appl. No.: 14/572,208

(22) Filed: Dec. 16, 2014

(65) Prior Publication Data

US 2015/0166809 A1 Jun. 18, 2015

Related U.S. Application Data

(60) Provisional application No. 61/916,470, filed on Dec. 16, 2013.

(51) Int. Cl.
C09D 11/50 (2014.01)
C09D 7/00 (2006.01)

(52) U.S. Cl.
CPC .............. C09D 11/50 (2013.01); C09D 7/007 (2013.01)

(58) Field of Classification Search
None
See application file for complete search history.

(56) References Cited

U.S. PATENT DOCUMENTS

| | | | | |
|---|---|---|---|---|
| 3,661,790 A * | 5/1972 | Hubert | ...................... | A63F 7/40 252/301.36 |
| 4,891,400 A * | 1/1990 | Schwabe | .................. | A61K 6/10 524/423 |
| 5,286,787 A * | 2/1994 | Podola | .................... | C08G 18/10 524/773 |
| 5,583,178 A * | 12/1996 | Oxman | ................ | A61K 6/0017 524/714 |
| 5,607,993 A * | 3/1997 | Christy | ..................... | C08K 7/18 524/237 |
| 5,693,689 A * | 12/1997 | Gibbon | ............ | A63B 21/00189 523/137 |
| 6,391,941 B1 * | 5/2002 | Williams | ................ | A01N 31/16 523/122 |
| 2002/0006598 A1 * | 1/2002 | Pruden | .................... | A61C 19/10 433/26 |
| 2005/0250620 A1 * | 11/2005 | Minuto | ............ | A63B 21/00189 482/49 |
| 2006/0287215 A1 * | 12/2006 | McDonald | ............... | A61K 8/02 510/441 |

(Continued)

Primary Examiner — Robert S Loewe
(74) Attorney, Agent, or Firm — Shook, Hardy & Bacon L.L.P.

(57) ABSTRACT

A putty paint compound for marking on a substrate, and a method and system of manufacturing a putty paint compound for marking on a substrate, are provided. In embodiments, the putty paint compound has a putty-like consistency that provides a delivery system for dye. In embodiments, a dye is dispersed into an elastic, pliable compound that maintains a putty-like form. When the compound is applied to a substrate having an activator, the dye dispersed in the compound creates a marking on the substrate that corresponds to the shape of the compound contacting the substrate. In further embodiments, the shape of the putty paint compound may be manipulated to provide a desired marking on a substrate, which may be altered by repeated or varied applications of one or more putty paint compounds.

12 Claims, 2 Drawing Sheets

(56) References Cited

U.S. PATENT DOCUMENTS

| | | | | |
|---|---|---|---|---|
| 2007/0105977 A1* | 5/2007 | Gabriel | .................... | A61K 8/31 523/122 |
| 2010/0322874 A1* | 12/2010 | Ribi | ........................ | A61K 8/02 424/59 |
| 2014/0008827 A1* | 1/2014 | Hankins | ............... | A61K 6/0005 264/20 |

* cited by examiner

PUTTY PAINT

CROSS-REFERENCE TO RELATED APPLICATION

This application claims priority to U.S. Provisional Patent Application No. 61/916,470, entitled "Putty Paint," filed Dec. 16, 2013, the entirety of which is hereby incorporated by reference.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed description section below. This summary is not intended to identify key features or essential features of the claimed subject matter, nor is it intended to be used as an aid in isolation to determine the scope of the claimed subject matter. In brief and at a high level this disclosure describes, among other things, a putty paint compound having a putty-like consistency that provides a delivery system for dye and/or pigment. In embodiments, a dye and/or pigment is dispersed into an elastic, pliable compound that maintains a putty-like form. When the compound is applied to a substrate having an activator, the dye/pigment dispersed in the compound creates a marking on the substrate that corresponds to the shape of the compound contacting the substrate.

DESCRIPTION OF THE DRAWINGS

Illustrative embodiments of the invention are described in detail below with reference to the attached drawing figures, and wherein.

DETAILED DESCRIPTION

Figure 1:
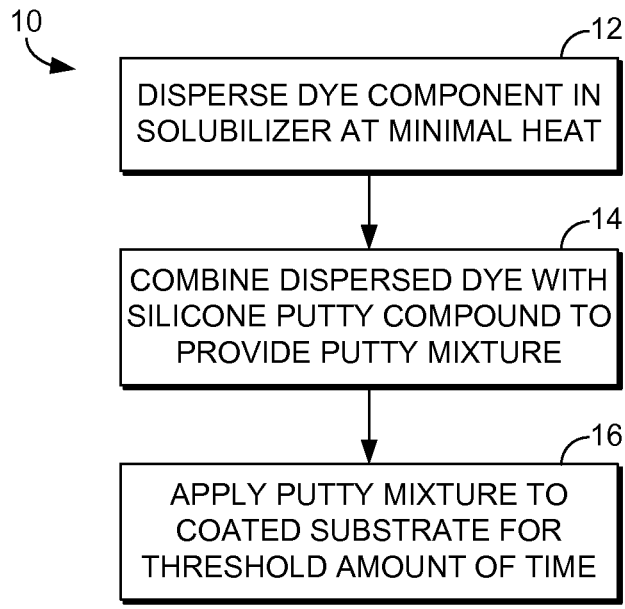
FIG. 1 is a flow diagram of a method of generating a putty paint compound, in accordance with an embodiment of the invention.

The subject matter of select embodiments of the invention is described with specificity herein to meet statutory requirements. But the description itself is not intended to necessarily limit the scope of the claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Embodiments of the invention include a putty paint compound having a putty-like consistency that provides a delivery system for dye and/or pigment. In embodiments, a dye and/or pigment is dispersed into an elastic, pliable compound that maintains a putty-like form. When the compound is applied to a substrate having an activator and/or coating, the dye/pigment dispersed in the compound creates a marking on the substrate that corresponds to the shape of the compound contacting the substrate. In further embodiments, the shape of the putty paint compound may be manipulated to provide a desired marking on a substrate, which may be altered by repeated or varied applications of one or more putty paint compounds.

Accordingly, in one embodiment, a putty paint compound is provided. The putty paint compound includes a dye and an elastic compound. The dye is dispersed into the elastic compound to provide a putty paint compound configured to mark on a substrate comprising an activator. In embodiments, dispersing the dye into the elastic compound includes dispersing the dye into a solubilizer at a minimum temperature for a minimum amount of time to provide a dye in solution, and dispersing the dye in solution into the elastic compound. In a further embodiment, the solubilizer is a silicone solubilizer oil. The elastic compound may be a pliable silicone compound. In embodiments, the elastic compound is one of a translucent elastic compound, an opaque elastic compound, or a pre-colored elastic compound. In further embodiments, dispersing the dye into the elastic compound includes warming the dye and the elastic compound during mixing.

In another embodiment, a method of preparing a putty paint compound includes dispersing an amount of dye into a solubilizer to provide a dye solution, and mixing the dye solution with a putty compound to provide a putty paint compound. The dye solution dispersed in the putty paint compound is configured to generate a marking on a substrate comprising an activator based on contacting at least a portion of the putty paint compound with at least a portion of the substrate. In embodiments, the dye solution comprises a silicone solubilizer oil. While in further embodiments, the dye solution and the putty compound are warmed during mixing. In some embodiments, the putty paint compound includes less than 5% dye.

In a further embodiment, an ink-delivery system includes a dye and a putty compound. The dye is dispersed into the putty compound such that the dye is consistently applied to a surface of a substrate upon contacting a portion of the putty compound with the surface of the substrate. In embodiments, the surface of the substrate comprises an activator configured to generate a corresponding change from a first color to a second color. In further embodiments, an amount of the change from the first color to the second color corresponds to an amount of time that the putty compound is applied to the surface of the substrate. In some embodiments, the putty compound is translucent, wherein the change from the first color to the second color is viewed through the translucent putty compound.

With reference now to the figures, a putty paint compound is described in accordance with embodiments of the invention. Various embodiments are described with respect to the figures in which like elements are depicted with like numerals.

As depicted in FIG. 1, embodiments of the invention include a method 10 of generating a putty paint compound. At block 12, a dye and/or pigment component is dispersed in a solubilizer at a minimum amount of heat. At block 14, the dispersed dye of block 12 is combined with a silicone putty compound to provide a paint putty mixture. Accordingly, at block 16, the paint putty mixture is applied to a coated substrate for a threshold amount of time to produce a desired effect. In some aspects, the paint putty mixture may be applied to a variety of different coated substrates configured to interact with the putty paint mixture. As such, a portion of the putty paint mixture may be molded into a first shape and applied to a first coated substrate to generate a first marking. Further, the same portion of putty paint mixture may then be molded into a second shape and applied to the first coated substrate to generate a second, differently shaped marking. In one aspect, because the same portion of putty paint mixture was used for application as both the first shape and the second shape, the first marking and the second marking may generate markings that are the same color, but different shapes. In further embodiments, a color of a marking generated at block 16 may depend directly or indirectly on an amount of time that the shaped putty paint mixture is applied to the coated portion of the substrate.

Figure 2:
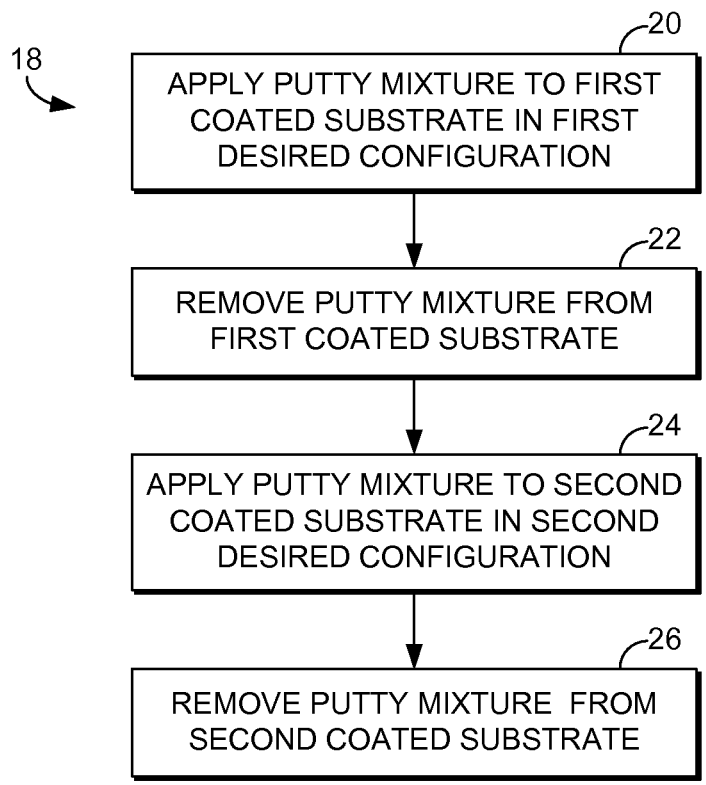
FIG. 2 is a flow diagram of a method of marking on a coated substrate with the putty paint compound, in accordance with an embodiment of the invention.

In FIG. 2, a method 18 of marking on a coated substrate with a putty paint compound is depicted according to an embodiment of the invention. At block 20, the putty mixture is applied to a first coated substrate in a first desired configuration. At block 22, the putty mixture is removed from the first coated substrate, revealing the corresponding marking on the first coated substrate from the first application of the putty mixture. In one embodiment, the dye dispersed within the putty paint compound interacts with the coating on the surface of the substrate to generate the corresponding marking. Accordingly, at block 24, the putty mixture is applied to a second coated substrate in a second desired configuration, such as a different, molded shape compared to the first desired configuration of block 20. At block 26, the putty mixture is removed from the second coated substrate, revealing the corresponding marking on the second coated substrate from the second application of the putty mixture. In one embodiment, the first coated substrate and the second coated substrate are two different substrates and/or surfaces, while in another embodiment, the first coated substrate and the second coated substrate are the same or different locations on the surface of a single substrate. In one embodiment of the invention, based on a type of surface coating on a substrate, a particular color may be generated based on interaction between the dye dispersed in the putty paint compound, and different types and/or formulations of surface coatings may generate different colored markings based on interaction with the dye dispersed in the putty paint compound.

Figure 3:
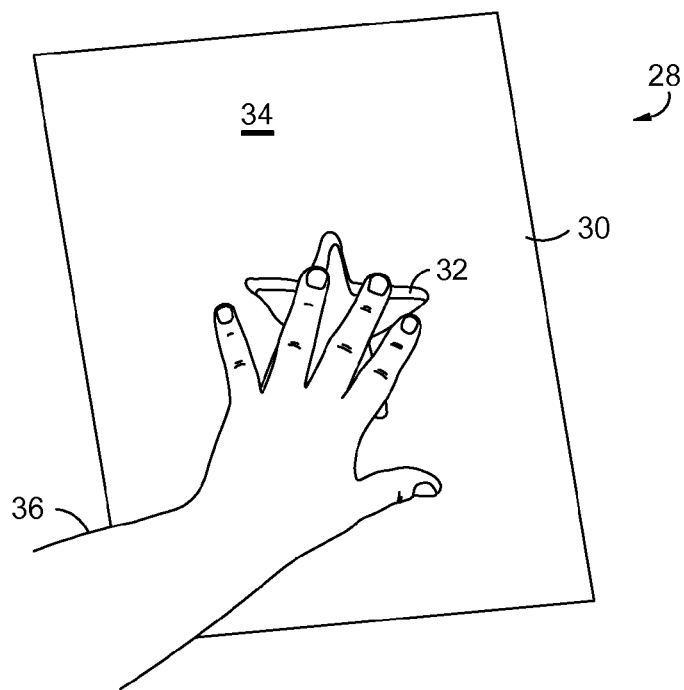
FIG. 3 is a front, perspective view of a molded portion of putty paint compound being applied to a coated substrate, in accordance with an embodiment of the invention.
Figure 4:
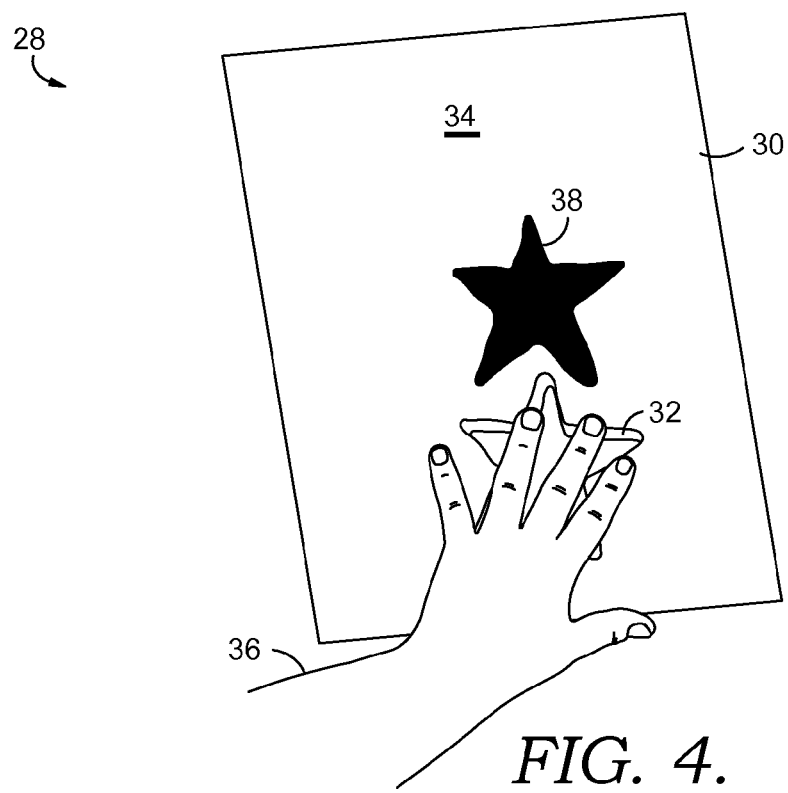
FIG. 4 is a front, perspective view of the molded portion of putty paint compound of FIG. 3 removed from the surface of the coated substrate, in accordance with an embodiment of the invention.

Turning now to FIG. 3, a front, perspective view 28 of a molded portion of putty paint compound 32 being applied to a substrate 30 is depicted in accordance with an embodiment of the invention. In embodiments, the substrate 30 has a coated surface 34 configured to react to the application of the putty paint compound 32. As such, a user 36 may position or re-position the molded portion of putty paint compound 32 on the surface 34 to generate any number of markings. As shown in FIG. 4, the molded putty paint compound 32 is removed from the surface 34 to reveal a marking 38 that corresponds to the marking of the molded putty paint compound 32.

In embodiments of the invention, the putty paint compound includes a dye and/or pigment formulation configured to mark on a substrate having an activator, without marking on an unintended surface, such as on a user manipulating the putty paint compound. In other words, the dye/pigment formulation does not leave color on a user's hands while marking on the intended surfaces. In embodiments, the dye, pigment, and/or ink is dispersed into a silicone solubilizer oil. In one example, the solubilizer oil is Fivsolv TPP. In another embodiment, the colorant portion of the putty paint compound includes a Leuco dye and/or pigment. During mixing of the dye/pigment into the silicone solubilizer oil, in some embodiments, the dye/pigment is heated at a minimum amount of heat for a minimum amount of time. In one embodiment, the dye, pigment, and/or ink is dispersed into a silicone solubilizer oil with minimal heat less than 60 degrees Celsius, for 8 to 12 minutes.

In further embodiments of the invention, the putty compound is a solid, pliable silicone compound, which may be referred to as "putty." In some embodiments, the putty compound is translucent, while in further embodiments the putty compound is opaque and/or pre-colored. In embodiments, using a translucent putty compound, the dye dispersed in the putty compound may generate a colored marking on a substrate (having an activator in its surface) that is visible through the translucent putty compound while the colored marking develops on the surface of the substrate. In some aspects, the dye solution dispersed in the putty compound is a transparent dye solution, causing no change in the appearance of the putty compound. As such, the same dye solution may be dispersed into different colors of putty compound, but may still generate a particular colored marking based on interaction with particular types of coatings on various substrates.

During manufacture of the putty paint compound, in some embodiments, the dye and the putty are mixed together to form a putty paint compound. Accordingly, the putty compound, such as a silicone putty, may be manipulated until pliable and then mixed with the dye to produce a combined, putty paint compound. In one embodiment, the putty paint compound is mixed together at ambient temperature, while in other embodiments, the putty paint compound is mixed at a warmed temperature greater than ambient temperature. In further embodiments, the solubilized dye solution is mixed with the putty (e.g., silicone putty) to provide a consistently mixed, putty paint compound after a minimum amount of mixing time. Based on a mixture of the dye and the putty compound, a consistent marking may be made using the putty paint compound on a coated substrate surface that is similar to a marking made by a felt-tipped marker or other fluid-dispersing marking device.

In embodiments of the invention, the combined putty paint compound, including a dye and a pliable putty, is configured to mark on a particular substrate that is responsive to the dye formulation used in the putty paint compound. In one embodiment, the putty paint compound may be used to color and/or "paint" on the substrate, such as a Color Wonder® substrate (e.g., a paper product) from Crayola® LLC of Easton, Pa. In one embodiment, the putty paint compound is configured to mark on any substrate having a corresponding coating on a surface, where the coating is responsive to the dye dispersed in the putty paint compound. For example, in one embodiment, the putty paint compound marks on a paper substrate coated with an activator, while in another embodiment, the putty paint compound marks on a cloth canvas substrate coated with an activator. Accordingly, in embodiments of the invention, the putty paint compound may be molded into a desired configuration and applied to a desired substrate. For example, the putty paint compound may be formed into a particular shape that can then "stamp" and/or mark an image on the surface of a substrate having an activator.

In embodiments of the invention, the putty paint compound may be shaped into a desired shape for applying on a coated substrate. In one embodiment, the putty paint compound may be formed by hand for applying to a coated substrate, such as by rolling, compressing, or otherwise manipulating by hand. In another embodiment, the pliable, putty paint compound may be formed into a desired shape for marking using a container and/or device for shaping putty compounds, such as a container having an opening for extruding the putty paint compound. Accordingly, the extruded and/or shaped putty paint compound may be applied to a coated substrate to provide a corresponding marking. In embodiments, a shaped portion of putty paint compound may be pressed against a substrate having a coated surface to provide an even coloring/marking on the surface. In some embodiments, portions of the putty paint compound may contact a substrate while other portions of the compound are spaced apart from the substrate, thereby providing a corresponding pattern in the marking on the surface. For example, where there is direct contact between the putty paint compound and the substrate, a change in color occurs on the surface of the substrate, while in other portions not contacting the putty paint compound, no such color change is generated.

In embodiments where the putty paint compound contacts the substrate having a coated surface, the activator on the surface gradually develops a colored marking over time. In some embodiments, the intensity of a marking on a substrate corresponds to a length of time that the putty paint compound contacted the surface of the substrate. As such, in one embodiment, an intensity of a colored marking on a substrate may be increased upon increasing an "exposure" and/or contact time between the putty paint compound and the surface of the substrate. In further embodiments, as the colored marking develops on the surface of the substrate, with a translucent putty paint compound, the change in color on the surface of the substrate may be viewed through the shaped putty paint compound.

In embodiments, the putty paint compound may be applied to a substrate in a variety of ways. For example, in one embodiment, the putty paint compound may be applied to an open portion of a stencil, to provide a corresponding marking on the substrate. In another embodiment, the putty paint compound may be applied to a substrate to fill in line art areas. In some embodiments of the invention, a blocking material applied to a substrate may be used to block markings from the putty paint compound on the areas of the substrate covered by the blocking material. For example, a glitter glue or three-dimensional glue product may be applied to a substrate, and upon drying, may form a barrier to press the putty paint compound against. In embodiments, the raised blocking material may form a perimeter against which the putty paint compound may be pressed, thereby providing a boundary for a marking and/or painting with the putty paint compound.

In further embodiments, the pliable putty paint compound may be rolled into a sheet of a desired thickness and cut into shapes using an appropriate cutting tool, such as a cookie cutter and/or scissors. As such, the cut-out shapes of putty paint compound may be applied to a coated surface of a substrate to create a marking that corresponds to the shape of the cut-out putty paint compound. In another embodiment, a first putty paint compound having a first dye color may be combined with a second putty paint compound having a second dye color. Accordingly, the combined mixture of the first putty paint compound and the second putty paint compound may produce a third color for marking on a coated substrate. In other words, multiple putty paint compounds may be combined to create "customized" colors of putty paint for marking on coated substrates. In some aspects, the customized color of the third putty paint compound is configured to mark on a coated substrate, while still not marking on a user (i.e., only marking on coated substrates). As such, the third color for marking on a coated substrate may be user-generated based on mixing of the first and second putty paint compounds together, thereby not requiring any additional solubilizing and/or pre-heating of the dyes already dispersed in the two individual compounds.

In some embodiments of the invention, the putty paint compound may be used to generate markings having particular characteristics, such as color shading, blending, and/or layering. For example, the putty paint compound may be applied and/or re-applied to a substrate, using the same color of putty paint compound or different colors of putty paint compound, over certain areas of the substrate that are already colored. As such, a first marking on a substrate with a putty paint compound may be enhanced by a second application of the same or a different putty paint compound, shaped in the same or a different configuration. In some aspects, an intensity of a color applied to a substrate using a putty paint compound may depend directly to the amount of pressure applied to the putty paint compound during contact with the substrate surface.

In further embodiments of the invention, the putty paint compound may be applied to a substrate in an elongated shape, such as a "string" of putty paint compound. As such, the putty paint compound may be used to "write" with or make spiderweb-like markings and/or lines on a coated substrate. In embodiments, the "string" putty paint may be pressed against a coated substrate and then pulled and stretched to a next, desired position on the substrate. Upon subsequent placement, the stretched putty paint compound may be held in place, such as with a user's finger, and stretched to a next location on the substrate, etc. Accordingly, the putty paint compound may be used to draw a series of lines or shapes on a surface. In one embodiment, the putty paint compound may be used to connect the dots of a picture product.

The putty paint compound may be further manipulated, in some embodiments of the invention, to alter the composition and/or characteristics of the putty paint compound. In one embodiment, the putty paint compound may be melted and dripped onto a coated substrate and used to generate a "melted" design on the coated substrate. In a further embodiment, after melting/dripping the putty paint compound onto a surface for marking, the putty paint compound may be removed from the substrate (e.g., rolled into a ball), and reused for additional marking.

In further embodiments of the invention, the concentration of dye and/or pigment dispersed in the putty paint compound may continuously decrease based on application of the putty paint compound to multiple surfaces. However, in some embodiments, the pliable and/or moldable features of the silicone putty are maintained while the marking features are diminished. As such, the putty paint compound may continue to be used for molding or shaping after the coloring or marking features are depleted.

In one embodiment of the invention, an additional and/or alternative colorant ingredient may be added to the putty paint compound to provide alternative or enhanced characteristics to the putty paint compound. For example, in one embodiment, the addition of a thermochromic dye and/or pigment may be combined with a dye, such as a Leuco dye and/or pigment, to provide a combined colorant feature of the putty paint compound. In embodiments, the combined colorant feature (having both a thermochromic dye/pigment and a Leuco dye/pigment) may be utilized as a timing mechanism during application of the putty paint compound to a substrate. In one example, the timing mechanism of the combined colorant feature provides an indication of the threshold amount of time before a color/mark will appear on the surface of a substrate.

In one embodiment of the invention, a user manipulates the putty paint compound (e.g., in their hands) until it is warmed enough to change the color of the putty paint compound from a first color (i.e., the starting/present color) to a second color (e.g., another color different from the starting/present color, including a colorless compound, a white compound, a clear compound, or another color dispersed in the putty compound, etc.). In one example, a putty paint compound including an "invisible" Leuco dye and/or pigment may have a translucent or somewhat clear appearance. In further embodiments, the putty paint compound including the Leuco dye/pigment has a tinted appearance, an opaque appearance, and/or a slightly colored appearance associated with the visible color of the Leuco dye/pigment incorporated into the putty paint compound. As such, embodiments of the putty paint compound having a Leuco dye/pigment may appear to have a translucent, tinted, and/or opaque color associated with the Leuco dye/pigment. In further embodiments, when a thermochromic pigment/dye is added to the putty paint compound, the visible color of the putty paint compound will change to the color of the thermochromic pigment/dye at ambient or the current environment temperature. Further, upon warming of the putty paint compound to a threshold temperature (e.g., within a predetermined chemistry temperature range), the thermochromic color may change to colorless, or another color that has been added to the putty paint compound. In embodiments, if no additional colorant has been added to the putty paint compound, the warmed putty paint compound may appear colorless and/or exhibit the original color of the putty compound. As such, in one embodiment, the thermochromic compound may temporarily change the appearance of the putty paint compound by becoming invisible once the compound is warmed to a threshold temperature.

In some embodiments, a variety of methods may be used to produce variable colors of the putty piant compound. For example, a variety of methods may be used to incorporate a first colorant, such as a Leuco dye/pigment, and a second colorant, such as a thermochromic dye/pigment, into the putty paint compound. In embodiments, one or more colorants are combined with the putty paint compound and configured to produce a corresponding change in color when exposed to warming within a particular range, such as between 25 to 35 degrees Celcius. In further embodiments, the putty piant compound is configured to produce a corresponding change in color when exposed to temperatures (such as by manipulation by a user's hands) within a particular range, such as between 26 to 32 degrees Celcius.

In one embodiment, a clear putty paint compound including a thermochromic dye/pigment has a specific visible color. Accordingly, when a threhsold temperature is reached, the thermochromic dye/pigment may become colorless, revealing the clear putty. In embodiments, if the thermochromic dye/pigment is added to a visually pigmented/dyed putty, when the putty compound reaches the threshold color-change temperature, the visible pigmented/dyed color of the putty will appear (i.e., the thermochromic dye/pigment may become colorless).

In some embodiments, the hidden Leuco pigment/dye added to the putty may be the same color as the as the visible putty color, while in other embodiments, the hidden Leuco pigment dye is a different color that adds to the variety of colors of the putty paint compound. For example, in one embodiment, a colorless, red "Leuco" pigment ink dispersion is added to a colorless putty. A visible yellow pigment/dye may also be added to the putty to provide a yellow and/or pale orange appearance to the putty (due to the corresponding mixing of at least a portion of the red Leuco pigment/dye with the yellow visible pigment dye). Additionally, a further colorant may be added to the putty paint compound, such as a thermochromic pigment (e.g., a dark orange color). As such, an overall color sequence associated with the appearance of the combined putty paint compound may be a dark-orange-to-yellow and/or pale orange color sequence, while the color that develops on a substrate (upon application of the putty paint compound) is red. In one embodiment, the method of addition of the thermochromic pigment/dye includes addition of a dry powder into the putty compound using a mixer, without heating.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A putty paint kit comprising:
 a putty paint composition comprising an elastic compound and a dye, the dye dispersed in the elastic compound, the dye being activated and transferable only in the presence of an activator that is specific to the dye; and
 a substrate having the activator that is specific to the dye, wherein the putty paint compostion generates visible dye marks on the substrate having the activator that is specific to the dye, the visible dye marks generated by the dye activating in the presence of the activator and the putty paint composition transferring dye to the substrate at points of contact.

2. The putty paint kit of claim 1, wherein the putty paint composition further comprises a dye solution comprising:
 a solubilizer and the dye,
 wherein the putty paint composition further comprises the dye solution dispersed in the elastic compound.

3. The putty paint kit of claim 2, wherein the solubilizer is a silicone solubilizer oil.

4. The putty paint kit of claim 1, wherein the elastic compound is a pliable compound comprising silicone.

5. The putty paint kit of claim 1, wherein the elastic compound is one of a translucent elastic compound, an opaque elastic compound, or a pre-colored elastic compound.

6. The putty paint kit of claim 1, wherein the putty paint composition is configured to change a color on the substrate from a first color to a second color once the putty paint composition reaches a minimum temperature, wherein the dye in the putty paint composition reacts with the activator only when the dye is at or above the minimum temperature.

7. The putty paint kit of claim 6, wherein the putty paint composition reaches the minimum temperature based on manual manipulation by a user.

8. The putty paint kit of claim 6, wherein the putty paint composition further changes the color on the substrate from a third color to a fourth color based on an increased contact time between the putty paint composition and the substrate.

9. The putty paint kit of claim 8, wherein the first color and the third color are the same color, and the second color and the fourth color are different colors.

10. The putty paint composition of claim 6, wherein an amount of change from the first color to the second color corresponds to an amount of time that the putty compound is applied to the surface.

11. The putty paint composition of claim 6, wherein the putty compound is translucent, wherein the change from the first color to the second color may be viewed through the translucent putty compound.

12. A putty paint kit comprising:
at least one elastic compound;
at least one dye having a first component that reacts with a corresponding substrate comprising an activator, wherein upon dispersal of the at least one dye into the at least one elastic compound, the elastic compound is configured to mark on a markable surface comprising the corresponding substrate having a coating of the activator;
at least one markable surface comprising:
a substrate corresponding to the at least one dye; and
an activator coating disposed on the substrate that is responsive to the corresponding dye, wherein the at least one markable surface is initially a first color before contact with the corresponding dye dispersed in the at one elastic compound, and wherein at least a portion of the at least one markable surface is changed to a second color upon contact with the corresponding dye dispersed in the elastic compound, wherein a marking of the second color is generated on the at least one markable surface that corresponds to a surface shape of a portion of the at least one elastic compound contacting the substrate and a location of the activator.

* * * * *